April 14, 1936.　　　F. W. SEYBOLD　　　2,037,153

TRANSMISSION

Filed July 13, 1934　　　7 Sheets-Sheet 1

FREDERICK W. SEYBOLD, Inventor

April 14, 1936.　　　F. W. SEYBOLD　　　2,037,153
TRANSMISSION
Filed July 13, 1934　　　7 Sheets-Sheet 2

Inventor
FREDERICK W. SEYBOLD,
Attorneys

Inventor
FREDERICK W. SEYBOLD,
BY
Attorneys

April 14, 1936.　　　F. W. SEYBOLD　　　2,037,153
TRANSMISSION
Filed July 13, 1934　　　7 Sheets-Sheet 4

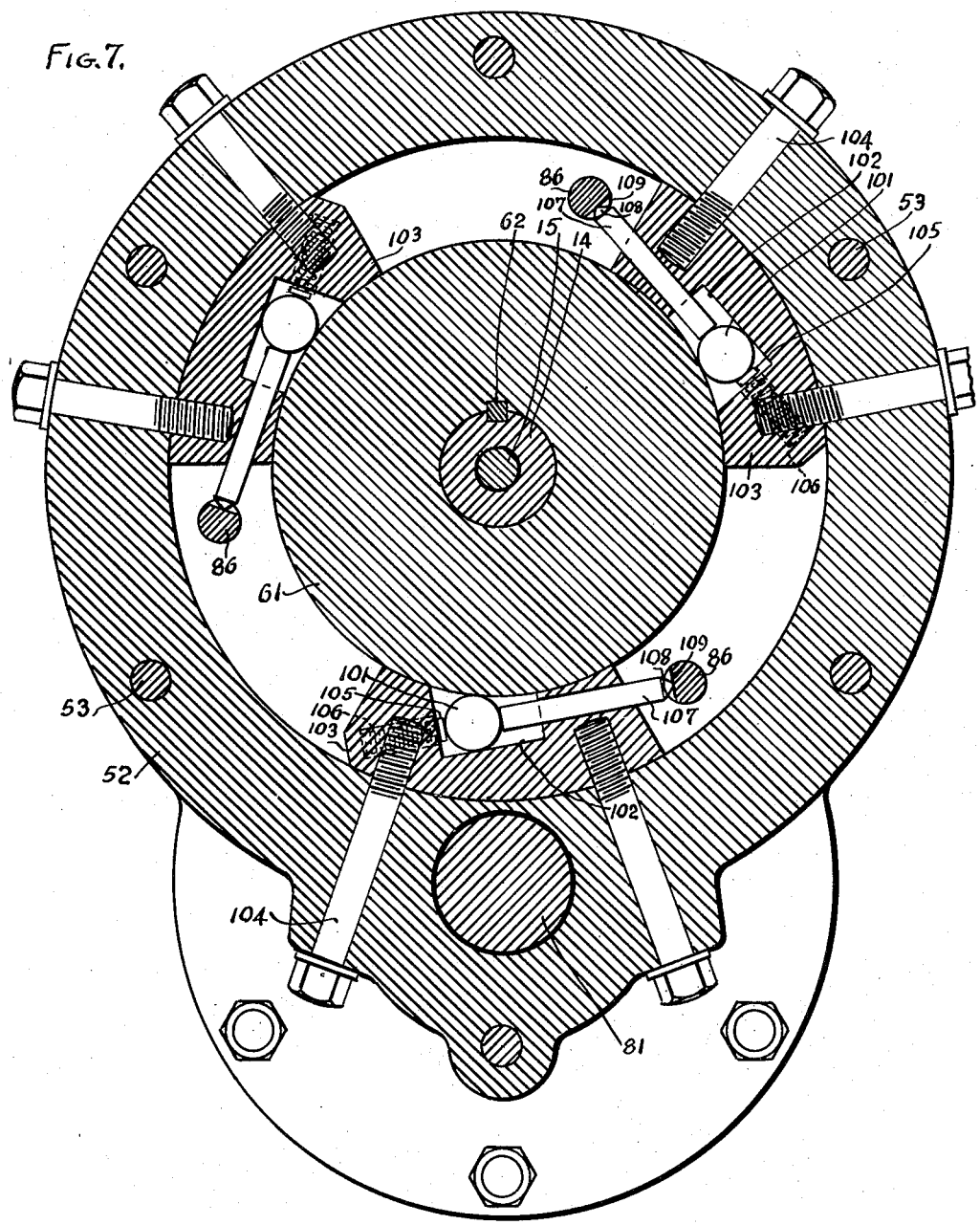

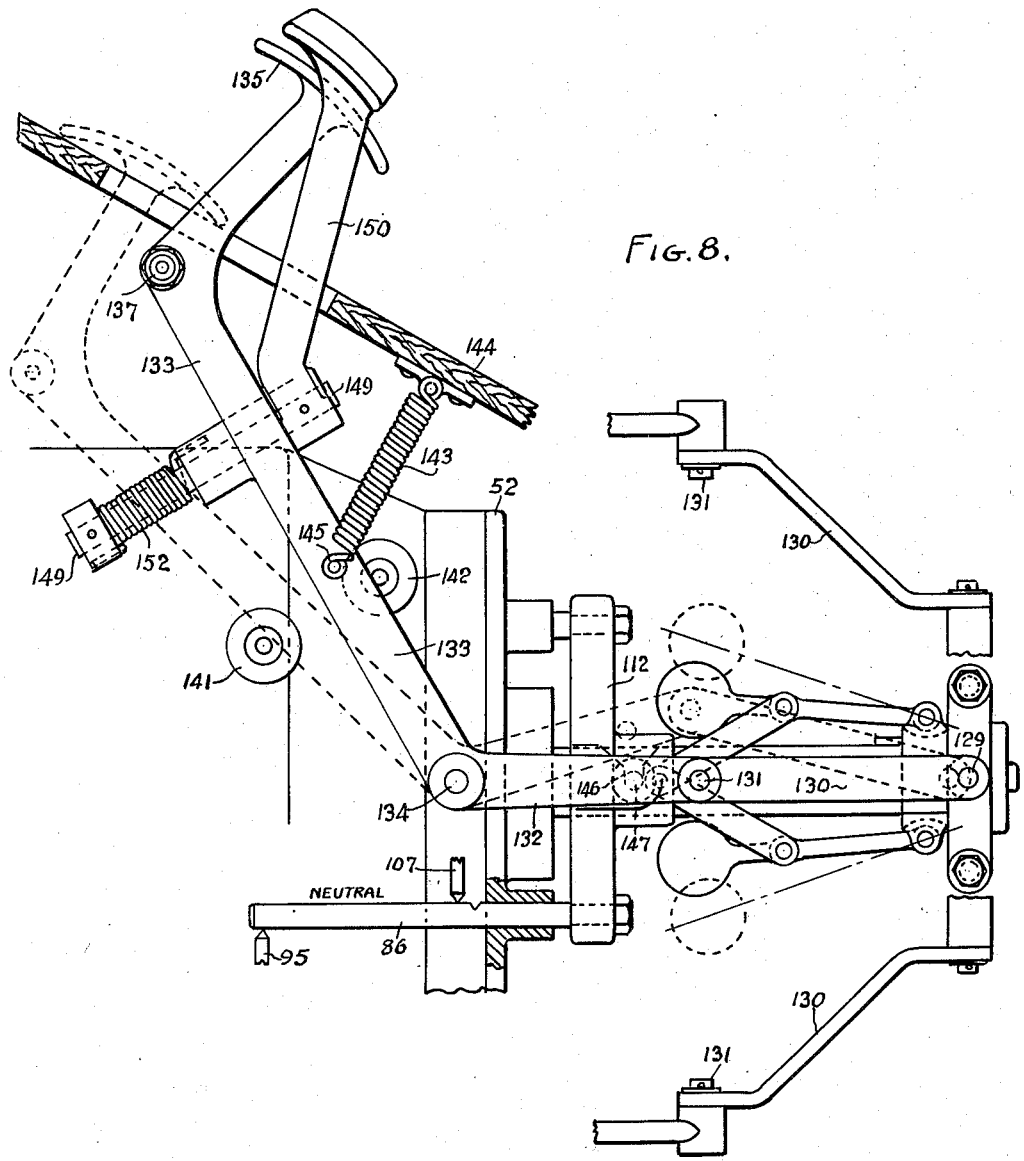

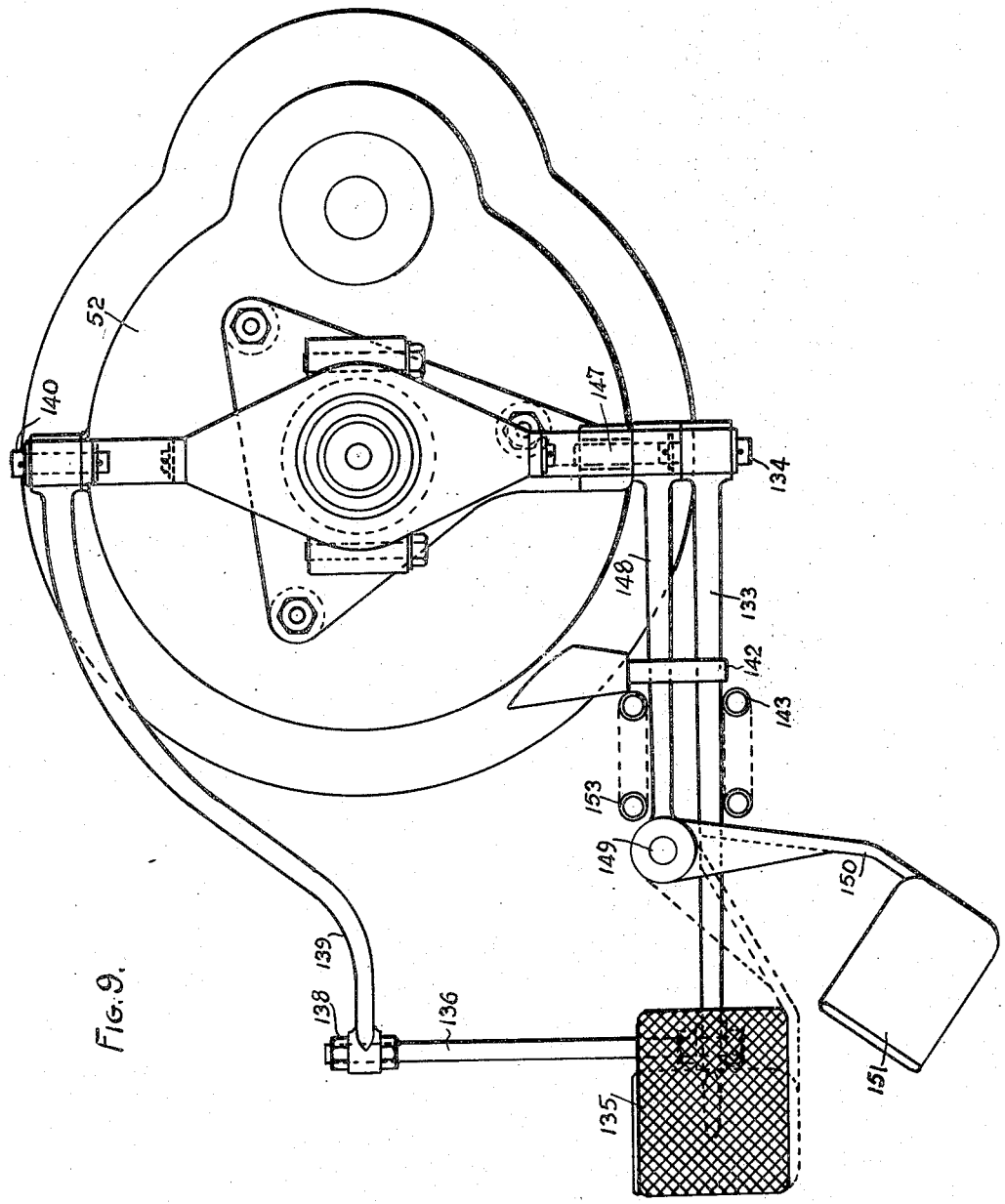

Patented Apr. 14, 1936

2,037,153

UNITED STATES PATENT OFFICE 2,037,153

TRANSMISSION

Frederick W. Seybold, Westfield, N. J.

Application July 13, 1934, Serial No. 735,017

12 Claims. (Cl. 74—260)

This invention relates to variable speed mechanisms for the transmission of power and, in particular, to automobile transmission mechanisms for transmitting power at variable speed or torque ratios between the engine and the drive shaft leading to the axles.

One object of my invention is to provide a power transmission unit in which a high engine speed may be converted into low axle speed, and the axle torque converted from high to low without the shifting of gears or toothed clutches, as when starting an automobile from rest or in climbing a hill, this being accomplished by a smoothly accelerated action and without steps or jerks.

Another object is to provide a power transmission unit of the above type, in which the output or axle drive shaft can be made to rotate in opposite directions without the necessity of an auxiliary gear set for this purpose.

Another object is to provide a power transmission unit of this description, in which the ordinary type of clutch is eliminated, the mechanism of my invention supplying such action in accordance with its regular operation.

Another object is to provide a power transmission unit, as above described, in which the conventional gear shift lever is entirely eliminated, the speed variation and direction being completely controlled by the movement of two pedals, whereby "forward", "reverse" and "neutral" motions are at the disposition of the operator.

Another object is to provide a power transmission unit of the above type, wherein the transition from a low torque at a high axle speed to a high torque at a low axle speed is accomplished automatically without the necessity of attention thereto on the part of the operator.

Another object is to provide a power transmission unit of this nature, which is so arranged that the "forward" motion of the axles must cease and the car be brought completely to a stop before the reverse mechanism can be operated to drive the car backward.

Another object is to provide a power transmission unit in which planetary gearing is combined with a fluid-operated device to obtain the smooth transition of speeds from "low" to "high" or direct drive.

Another object is to provide a power transmission unit of the type described immediately above, wherein the fluid-operated device is equipped with a reaction element adapted to increase its torque, thereby enabling the use of a smaller fluid-operated device than would be practical without such element.

Another object is to provide a power transmission unit combining a fluid-operated device which is yieldingly connected to planetary gearing through a friction band or annular element, the latter likewise having a frictional portion which is adapted to engage, in a clutching manner, another portion of the mechanism.

In the drawings:

Figure 7 is a cross section along the line 7—7 of Figure 1, showing the "reverse" motion locking clutch;

Figure 8 is a side elevation, partly in section, of a portion of the power transmission unit of my invention, showing the various foot pedals and their connections to the governor mechanism which actuates the transmission, the unit being in its "neutral" position;

Figure 9 is a rear end elevation of the foot pedal mechanism and its connections, as shown in Figure 8;

Figure 10 is a fragmentary diagrammatic view of the position of the control rod when the unit is in position for "reverse" operation;

Figure 11 is a view similar to Figure 10, but with the parts in position for "low" speed operation;

Figure 12 is a view similar to Figures 10 and 11, but with the parts shown in position for "high" speed operation;

Figure 13 is an enlarged fragmentary cross section through one of the discharge ports 31 of Figure 1, showing a portion of the closure ring.

General arrangement of transmission unit

Figure 1:
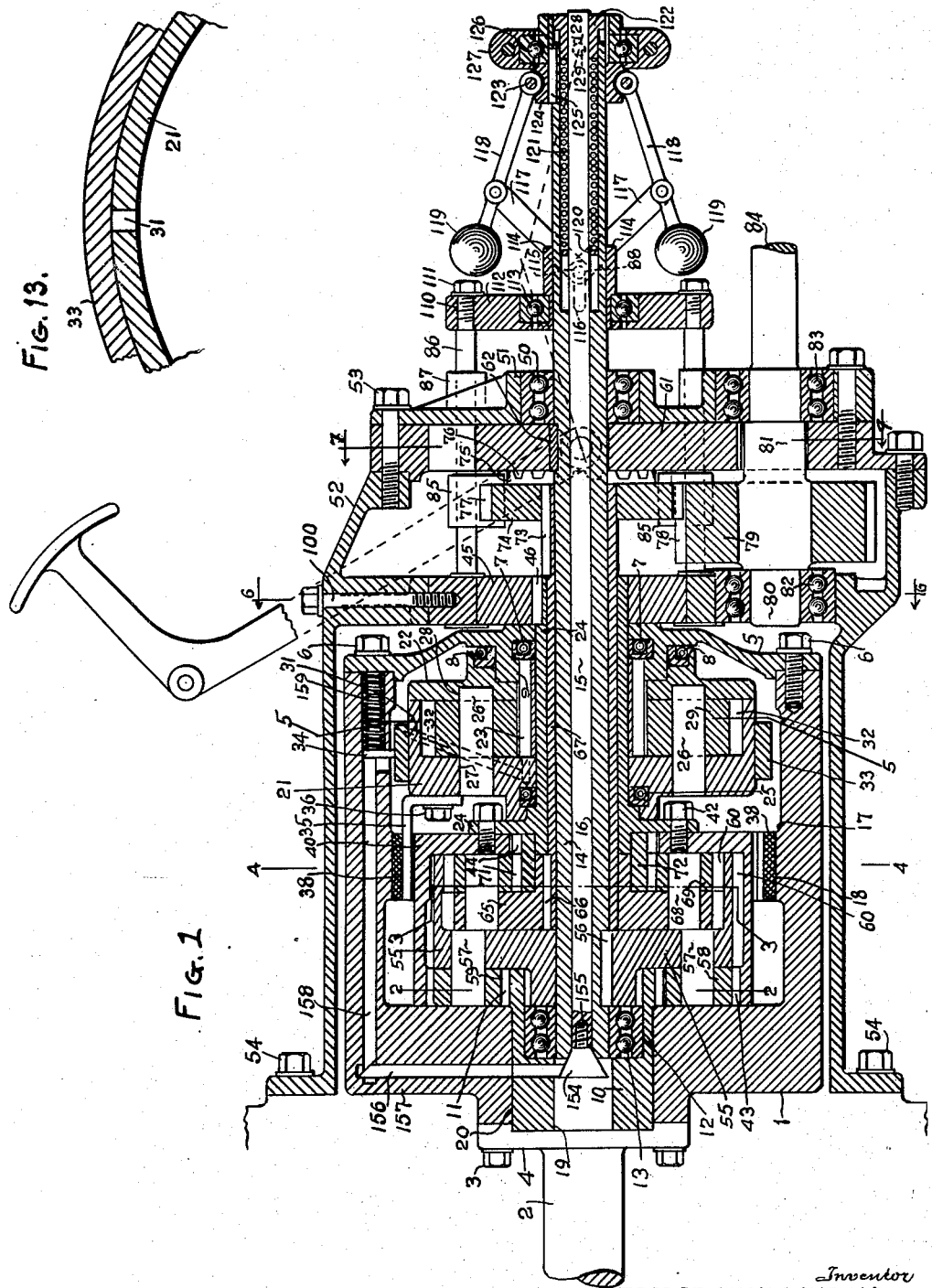
Figure 1 is a longitudinal vertical section through the power transmission unit or assembly of my invention, showing the parts in a "high" or "direct drive" position.

In general, the variable speed transmission unit of my invention can best be understood, as a whole, from Figure 1. It consists essentially of six assemblies. First comes the driving assembly in the form of a hollow fly wheel, and serving as a container for much of the remaining mechanism. Second comes the primary floating assembly consisting of a hollow internal gear connected to a fluid-operated gear pump, located near the section lines 4—4 and 5—5 in Figure 1. Third comes the secondary floating assembly consisting of a set of planetary gearing drivingly connected at one end to the hollow fly wheel and at the other end to a fly-ball governor: this is located near the section line 2—2 of Figure 1 and extends along the drive shaft. Fourth comes a driven assembly, consisting of a secondary planetary gear set, located near the section line 3—3 of Figure 1 and drivingly connected to the axles of the automobile or to the output shaft of the machinery in which it is used. Fifth comes the pedal control assembly, shown to the left and top of Figure 1, and still better shown in Figures 8 and 9. Finally comes the transmission casing which serves as a support and container for the mechanism assemblies previously listed.

Driving assembly

Referring to the drawings in detail, Figure 1 shows the driving assembly of my transmission unit as consisting of a hollow fly wheel 1 which is roughly in the form of a cylindrical shell and which is secured at its lefthand end to the engine shaft 2, as by the cap screws 3 passing through the connecting member 4 therebetween. The hollow fly wheel 1 is closed at its right-hand end by the cover plate 5, which is secured thereto by the cap screws 6 (Figure 1). In order to prevent the escape of fluid from the interior of the mechanism, the fly wheel cover plate 5 is provided with the oil seals 7 and 8.

The hollow fly wheel 1, which is the driving element of the transmission unit, is drivingly connected to the remainder of the mechanism at two points. The fly wheel cover 5 is provided with internal gear teeth 9, which serve to connect the fly wheel 1 to the oil pump of the primary floating assembly to be described later. At its lefthand end the hollow fly wheel 1 is provided with the "sun" gear 10 of the primary planetary gear train, this gear 10 having external teeth 11 which mesh with the teeth of the planetary pinions in the secondary floating assembly to be described later.

The primary "sun" gear 10 is provided with a recess 12 which serves to receive the ball bearing 13. The latter rotatably supports the secondary shaft 14 of the secondary floating assembly, as well as allowing the governor control shaft 15 to be moved to and fro inside the bore 16 of the secondary shaft 14.

Approximately midway between the fly wheel cover plate 5 and the opposite end of the hollow fly wheel 1 is a raised internal portion 17 which is provided with an internal annular surface 18, serving as the contact surface for the friction clutch band of the primary floating assembly to be described below. The hollow fly wheel 1 is also provided with other bores seen at the lefthand upper end of Figure 1, and serving to receive certain control rods also to be described later. The primary "sun" gear 10 contains a hollow portion or bore 19, which allows the actuating mechanism for these rods to move freely. The hollow hub of the "sun" gear 10 is firmly secured to the hollow fly wheel 1, as in the bore 20, so that the two rotate as a unit.

Primary floating mechanism assembly

Figure 5:
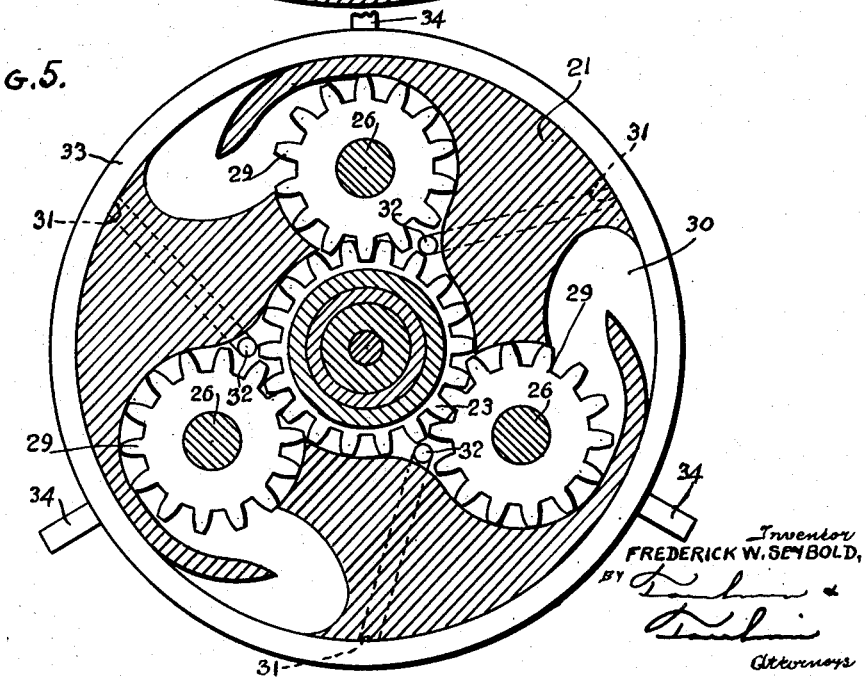
Figure 5 is a cross section along the line 5—5 of Figure 1, showing the fluid-operated device and its connections.

The primary floating mechanism assembly is located mainly within the righthand portion of the hollow fly wheel 1. It includes a fluid pump casing 21 having a cover plate 22 and containing a fluid pump of the gear type. The driving gear 23 of this pump has its teeth intermeshed with the internal teeth 9 on the hollow fly wheel cover plate 5 so that a driving connection is established between it and the engine drive shaft 2 (Figures 1 and 5). The pump drive gear 23 and the pump casing 21 are bored so as to have a running fit over the sleeve 24 upon which they are rotatably supported. Leakage from the interior of this pump is prevented by the oil seal 25.

This fluid pump is provided with several pinion pins 26 supported in bores 27 and 28 in the pump casing 21 and the pump casing cover plate 22 respectively. These pinion pins 26 serve to rotatably support the pump pinions 29 which mesh with the pump driving gear 23 (Figures 1 and 5).

The pump is likewise provided with intake passages 30 (Figure 5) and discharge ports 31 at the ends of the discharge passages 32 thereof.

Surrounding the pump casing 21 and slidably mounted thereon is the discharge port closing ring 33. This ring 33 is provided with several radially-projecting pins 34, which serve to move the ring to and fro in order to open and close the pump discharge ports 31 in a manner and by connections described later. The intake passages 30 are open to a supply of oil inside the hollow fly wheel 1, and especially in the portion thereof surrounding the pump, and are only partially covered by the discharge port closing ring 33. When the fly wheel is rotating at a high enough speed, the oil will be thrown by centrifugal force against the wall of the fly wheel and will, therefore, be continuously available and accessible to the pump intake passages 30.

As the pump is rotated by its driving gear 23 meshing with the teeth 9 on the hollow fly wheel cover plate 5, it drives the pump pinions 29 (Figure 5). Oil is then drawn into the pump through the intake passages 30 and discharged through the discharge passages 32 and the discharge ports 31. If the closure ring 33 impedes the discharge of the fluid, in the manner hereinafter described, a reaction is set up which causes the pump casing 21 to start rotating. The pump thus acts as a variable speed device between the hollow fly wheel 1 and the mechanism beyond it.

Figure 4:
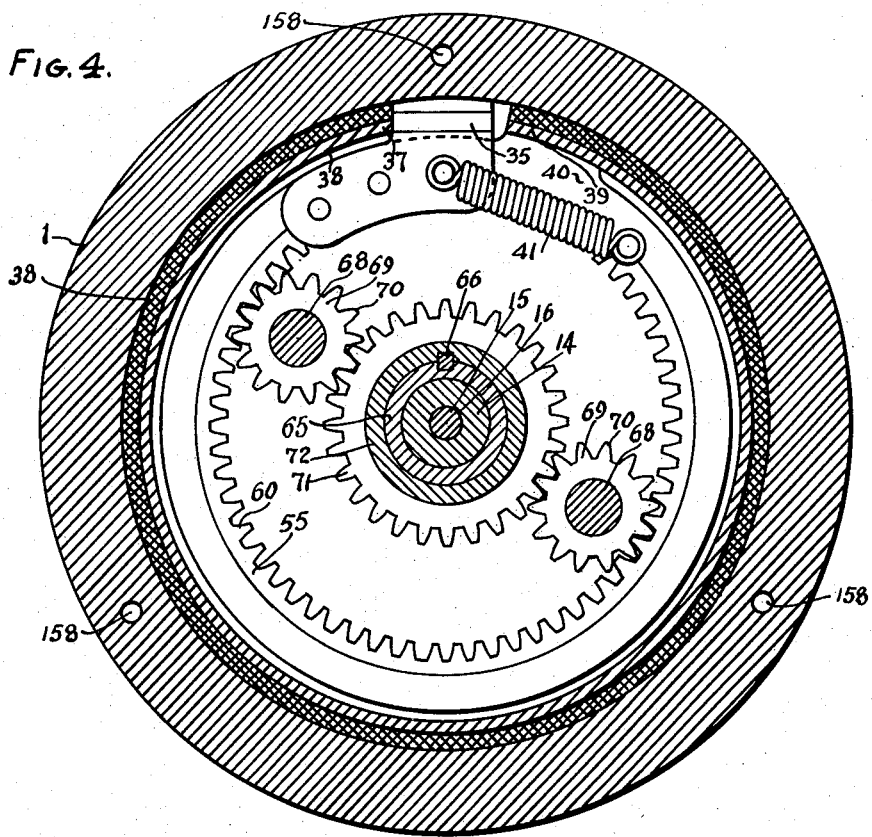
Figure 4 is a cross section along the line 4—4 of Figure 1, showing the frictional element forming the yielding connection between the fluid-operated device and the primary floating mechanism, as well as providing a frictional slippage between itself and the main driving element attached to the engine.

On the pump casing 21 is mounted the bracket 35, as by the cap screws 36 (Figures 1 and 4). The bracket 35 at its opposite end engages the free end 37 of a friction band 38 whose opposite end 39 is firmly secured to the internal gear 40. A tension spring 41 urges the pump casing 21 and the internal gear 40 relatively to one another in one direction in such a manner that the friction band 38 will be out of engagement with the contact surface 18 of the raised portion 17 on the hollow fly wheel 1. The friction band 38 serves as an automatically operative clutch which engages its contact surface 18 only when the thrust on the bracket 35 and the resisting torque of the gear 40 are great enough to overcome the tension of the spring 41 so that the free end 37 of the friction band 38 is pushed tangentially.

The internal gear 40 is of elongated form and is secured at its inner end to the sleeve 24 by means of the cap screws 42. The internal gear 40 is provided with two sets of internal gear teeth 43 and 44. The internal gear teeth 44 engage the driven assembly, whereas the teeth 43 engage the secondary floating assembly, as described later.

Figure 6:
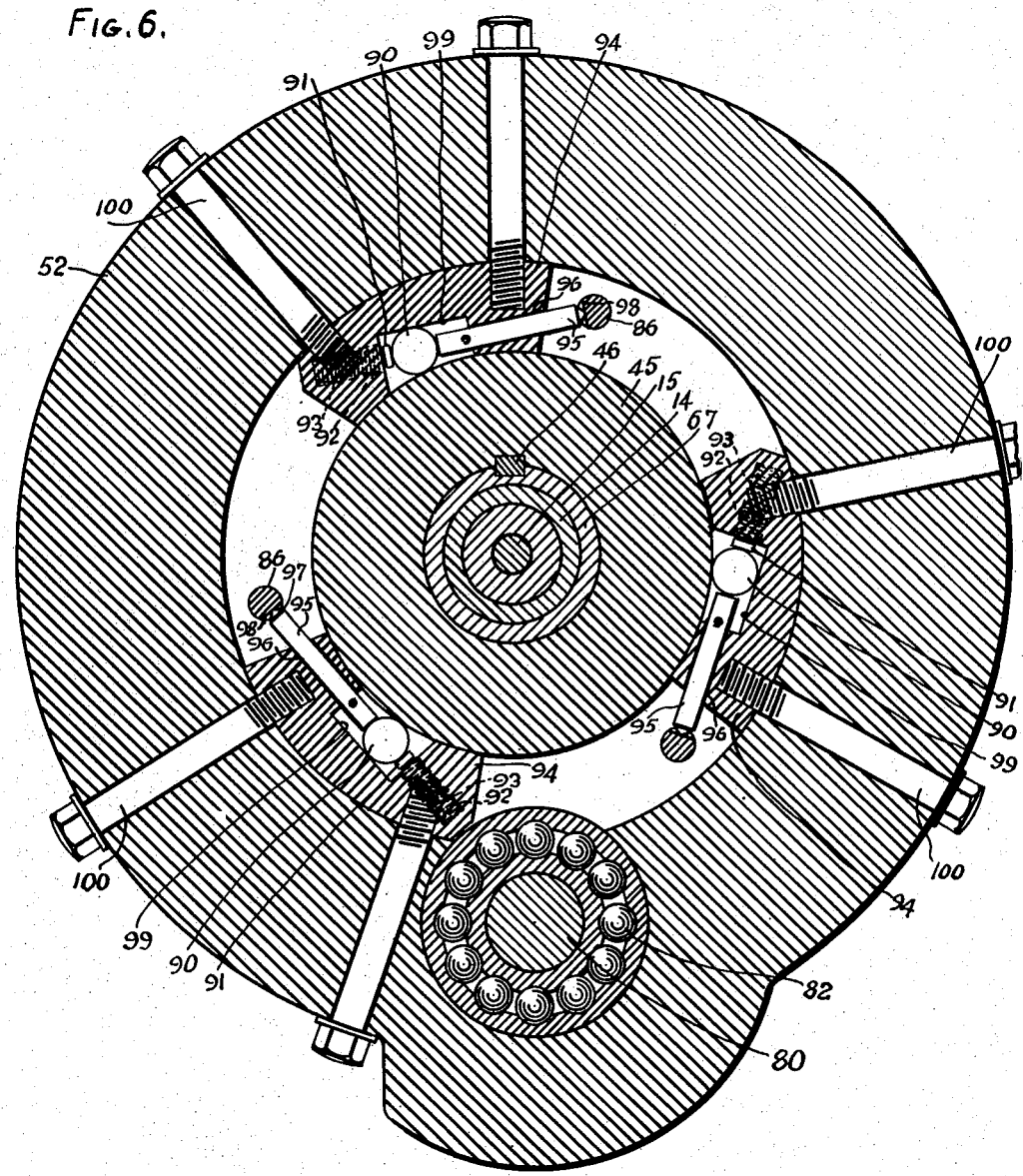
Figure 6 is a cross section along the line 6—6 of Figure 1, showing the "low speed" locking clutch.

To the righthand end of the sleeve 24 is secured the roller clutch locking disk 45, as by the key 46 (Figures 1 and 6). The clutch disk 45 cooperates with the clutch mechanism to be described later so as to allow the sleeve 24 and the internal gear 40 either to rotate or to be locked against rotation, in the manner subsequently described, in one direction only.

*Secondary floating assembly*

The secondary floating assembly consists of a set of planetary gearing mounted on the hollow shaft 14 and equipped with a locking clutch somewhat similar to that of the primary floating assembly. The hollow shaft 14 is journaled at its lefthand end in the ball bearings 13, as previously described, and at its righthand end in the ball bearings 50 mounted in the cover plate 51, secured to the transmission casing 52 as by the cap screws 53 (Figure 1). The transmission casing 52 is stationarily mounted upon the crank case of the automobile or other machine, as by the cap screws 54, and serves to surround the hollow fly wheel 1, as well as to carry the control mechanism of the transmission unit.

Figure 2:
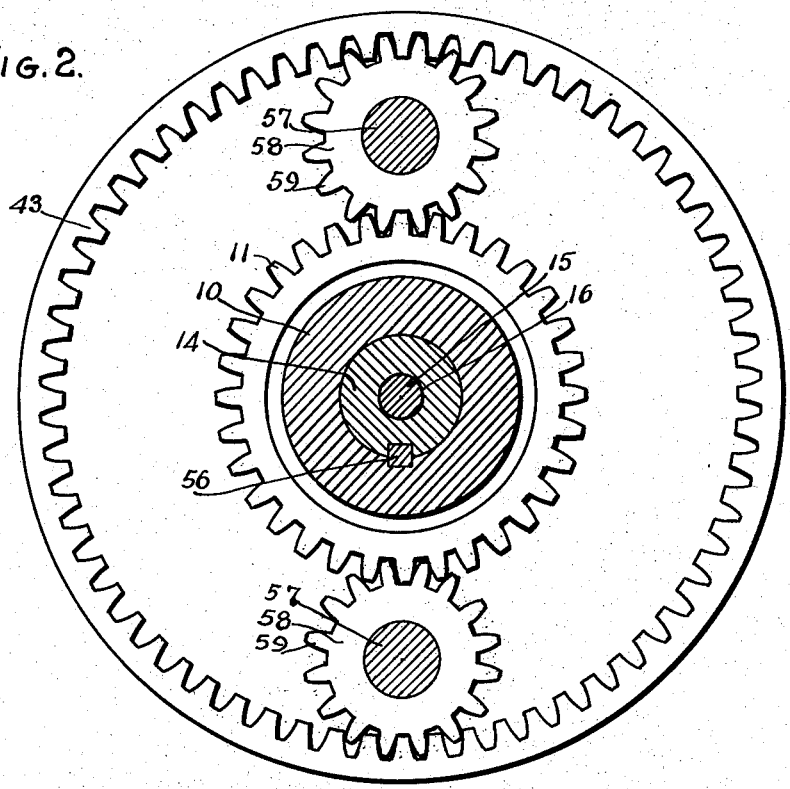
Figure 2 is a cross section along the line 2—2 of Figure 1, showing the planetary gearing of the secondary floating mechanism.

The planetary gear set of the secondary floating assembly consists of a spider 55 which is secured to the hollow shaft 14, as by the key 56. The spider 55 (Figures 1 and 2) is provided with two or more pinion pins 57 on which are mounted the planetary pinions 58, whose teeth 59 mesh on one side with the teeth 11 of the primary "sun" gear 10 secured to the hollow fly wheel 1, and on the other side with the teeth 43 of the hollow internal gear 40 (Figures 1 and 2).

The spider 55 is provided with an extension having internal teeth 60. The latter mesh with the teeth of the planetary pinions of the driven assembly to be described later.

The secondary floating assembly is provided with a roller clutch locking disk 61 secured to the righthand end of the hollow shaft 14, as by the key 62 (Figures 1 and 7). This clutch disk 61 serves, in a manner similar to that of the clutch disk 45 of the primary floating assembly, to lock the secondary floating assembly or to release it as desired. The manner in which this is accomplished is described later. The connections by which the governor control shaft 15 is caused to move to and fro within the hollow shaft 14 through the action of a fly-ball governor will also be described later.

*Driven assembly*

Figure 3:
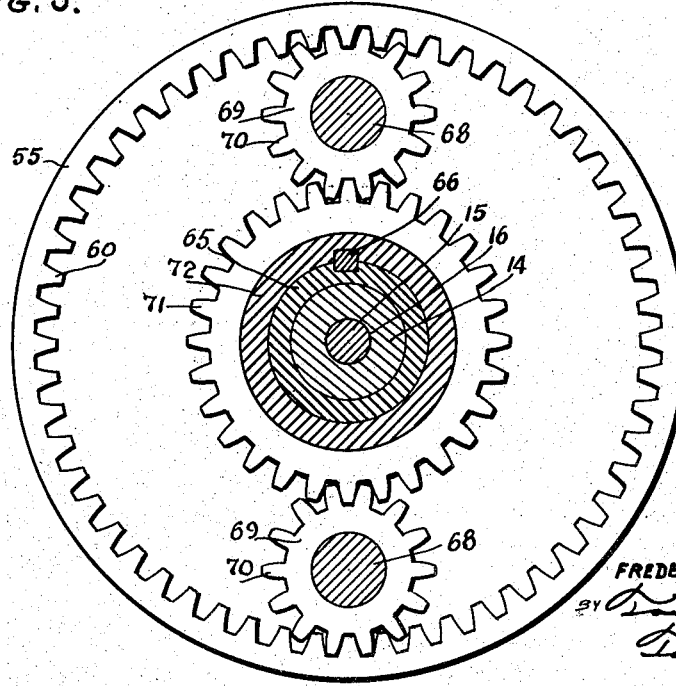
Figure 3 is a cross section along the line 3—3 of Figure 1, showing the planetary gearing of the driven mechanism.

The driven assembly of the mechanism consists of the planetary spider 65 which is secured, as by the key 66, to the sleeve 67. The latter rotates freely in the space between the sleeve 24 and the hollow shaft 14 (Figures 1 and 3).

The planetary spider 65 is provided with pinion pins 68 on which are mounted the planetary pinions 69. The latter are provided with teeth 70, which mesh on one side with the internal teeth 60 of the planetary spider 55 of the secondary floating assembly; and on the opposite side with the teeth 71 of the "sun" gear 72 (Figures 1 and 3). The "sun" gear 72 of this driven planetary gear set is rotatably mounted on the hub of the planetary spider 65. The teeth 71 of the "sun" gear 72 are likewise intermeshed with the teeth 44 of the hollow internal gear 40 (Figure 1) so that a driving connection exists therebetween.

At its righthand end the sleeve 67 is provided with multiple splines 73, on which the gear 74 is slidably mounted. The sliding gear 74 is provided with clutch teeth 75 on its righthand face, these interlocking with similar teeth 76 located on the adjacent face of the roller clutch locking disk 61 of the secondary floating assembly. The sliding gear 74 is also provided with gear teeth 77, which mesh with the teeth 78 of the widefaced gear 79 (Figure 1). The latter is provided with extension hubs 80 and 81 journaled in antifriction bearings 82 and 83 respectively. The hub 81 has a further extension 84 which forms the output shaft of the transmission.

The sliding gear 74 is engaged by the three shifting yokes 85 (Figure 1), which are mounted upon the three control rods 86. The latter are journaled in bearing bosses 87 on the cover plate 51 of the transmission casing 52. Thus when the control rods 86 are moved to and fro, the sliding gear 74 is caused to move to and fro along the splines 73: its teeth 75 are thereby caused to become engaged with or disengaged from the teeth 76 of the secondary floating assembly clutch disk 61. When thus engaged, a direct driving connection exists between the engine shaft 2 and the output shaft 84, this being the "high" gear arrangement of the transmission unit. The teeth 77 and 78 of the gears 74 and 79 may be inclined a small amount in order to facilitate the relative sliding thereof.

*Control assembly*

The control assembly for the transmission unit consists of a pair of locking clutches together with a fly-ball governor and suitable foot pedals connected therewith.

The roller clutch disk 45 of the primary floating assembly (Figures 1 and 6) is engaged by the clutch rollers 90. The latter are urged in one direction by the plungers 91 impelled by the coil springs 92 mounted in the bores 93 of the stationary clutch members 94 (Figure 6); and in the opposite direction by the roller release pins 95 slidably mounted in the bores 96 thereof. The pointed ends 97 of the clutch release pins 95 are adapted to engage notches 98 in the control rods 86. The clutch rollers 90 are adapted to be wedged between the periphery of the clutch locking disk 45 and the opposite wall of the cut-away portion 99 in the stationary clutch members 94. The latter are secured to the transmission casing 52 by means of the bolts 100 extending therethrough.

The clutch rollers 90 thus are caused to become wedged between the clutch locking disk 45 and the stationary clutch members 94 when the clutch roller releasing pins 95 are withdrawn, as when their pointed ends 97 enter the notches 98 of the control rods 86 (Figure 6). In this event, the clutch disk 45 becomes locked to the transmission casing 52 with rotation in a clockwise direction. Rotation in a counter-clockwise direction is freely permitted, however, since the rollers 90 immediately release themselves from the wedge-shaped spaces in which they are mounted.

The locking clutch disk 61 for the secondary floating assembly, and its adjacent connections, are similar to those of the primary floating assembly just described. The locking clutch disk 61 is similarly engaged by the clutch rollers 101 mounted in the cut-away portions 102 of the stationary clutch members 103, the latter being secured to the transmission casing 52 by the bolts 104. The rollers 101 are urged in one direction by the plungers 105 and their coil springs 106; and in the opposite direction by the clutch releasing rods 107 having the pointed ends 108 engaging the notches 109 in the control rods 86. It will be observed, however, that the cut-away portions 102 of the stationary clutch members 103 form wedge-shaped chambers extending in the opposite direction from the cut-away portions 99 of the stationary clutch members 94. Accordingly, when the pointed ends 108 of the clutch-releasing pins 107 fall into the notches 109 in the control rods 86, the rollers 101 wedge themselves between the clutch disks 61 and the opposite wall of the cut-away portions 102 in such a manner as to lock the entire assembly in a stationary position when counter-clockwise rotation occurs. When clockwise rotation occurs, however, the rollers 101 immediately release themselves, permitting free rotation in this direction.

Thus when the releasing pins 95 are withdrawn, the clutch of the primary floating assembly locks the latter in a stationary position when the mechanism tends to rotate in a clockwise direction, yet releases it immediately upon rotation in a counter-clockwise direction. On the other hand the clutch mechanism attached to the secondary floating assembly under the same circumstances tends to lock the secondary floating assembly in a stationary position when counter-clockwise rotation commences, yet immediately releases itself when clockwise rotation begins. The directions "clockwise" and "counter-clockwise" are taken looking from the direction of the fly-ball governor in Figure 1—i. e., from the operator's seat, looking toward the engine drive shaft 2.

The control rods 86 are anchored, as by the bores 110 and the nuts 111, to the slidable but non-rotating governer lock plate 112 (Figure 1). The latter is mounted upon the anti-friction bearing 113, separating it from the sliding sleeve 114, through which passes the actuating pin 115, by which it is moved to and fro. The pin 115 likewise passes through a slot 116 in the hollow shaft 14, and is pivotally connected by the governor links 117 to the governor arms 118 of the fly-ball governor 119. The pin 115 passes through and engages the walls of a transverse bore 88 in the governor control shaft 15, whereby the latter is moved to and fro through the action of the fly-ball governor 119 through the action of the links 117 connecting it to the fly-ball governor 119. The pin 115 is engaged and urged in one direction by the washer 120 backed by the coil spring 121, surrounding the governor control shaft 15. The opposite end of the coil spring 121 rests against the adjusting collar 122.

The ends of the fly-ball governor arms 118 are pivotally mounted upon the pins 123 in the collar 124. The latter is slidably mounted, as at 125, upon the hollow shaft 14 (Figure 1), and also carries the inner race of the ball bearing 126. The outer race of the ball bearing 126 is mounted in the collar 127, which is provided with bores 128, in which are mounted pivot pins 129. The latter serve as pivotal connections for the connecting links 130 (Figures 1 and 8), these being pivotally connected, as at 131, to the lower portion 132 of the control pedal lever 133 (Figure 8). The latter is pivotally mounted upon the fulcrum pin 134, fixedly supported upon the transmission casing 52, and also is provided with the pedal portion 135 at its upper end (Figures 8 and 9). A tie rod 136 is connected, as at 137, to the control pedal lever 133 and at its opposite end, as at 138, is connected to the auxiliary lever 139. The latter (Figure 9) is pivotally mounted at its lower end upon the pivot pin 140, this being fixedly supported upon the opposite side of the transmission casing 52 from the fulcrum pin 134. The motion of the control pedal lever 133 is limited by the stop pins 141 and 142 (Figure 8) and the pedal itself is urged upward by the coil spring 143 attached at one end to the underside of the floor boards 144, and at the opposite end to the pin 145 on the control pedal lever 133. This spring 143, therefore, holds the control pedal lever 133 against the stop pin 142. Thus the depressing of the control pedal 135 causes the collars 127 and 124 to slide along the hollow shaft 14 and thus change the position of the governor pin 115 through the fly-ball governor arm 118 and the governor links 117.

The governor lock plate 112 is provided with a notched portion 146 (Figure 8), movable therewith and adapted to engage the neutral treadle pin 147 when the two are opposite one another. The neutral treadle pin 147 is carried by the L-shaped neutral treadle lever 148 (Figures 8 and 9). The latter is fulcrumed on the pin 134, which is fixed in the transmission casing 52 as previously described. The upper end of the neutral treadle lever 148 has the pivotal connection 149, to which is attached the neutral treadle arm 150 with the pedal pad 151. A coil spring 152, connected between the neutral treadle lever 148 and the neutral treadle arm 150, urges the latter in a counter-clockwise direction. A tension spring 153, similar to the tension spring 143 and anchored in a similar manner, urges the neutral treadle lever 148 upward against the stop pin 142: the lower stop pin 141 limits its motion in the opposite direction.

On the opposite end of the governor control shaft 15 from the fly-ball governor 119 is mounted a truncated cone 154, as by the threaded connection 155. Engaging the cone 154 are correspondingly beveled rods 156, which pass outward through radial bores 157 in the hollow fly wheel 1 (Figure 1). The outer end of each beveled rod 156 is likewise beveled to engage a correspondingly beveled end on a longitudinal beveled rod 158. The opposite ends of the longitudinal beveled rods 158 engage the actuating pins 34 attached to the discharge port closure ring 33, these being urged in the opposite direction by the coil springs 159. The springs 159 urge the ring 33 in the direction of opening the discharge ports 31.

OPERATION OF THE TRANSMISSION UNIT

*Idling or "neutral" position*

To cause the transmission unit to operate in the idling or neutral position, so that the engine shaft 2 will not transmit power to the output shaft 84, it will be assumed that the emergency clutch of the automobile has been set so as to lock the axles of the car, and also that the "neutral" treadle pin 147 has been dropped into the notch 146 (Figure 8). The engine is then started in the usual way, whereupon the hollow fly wheel 1 rotates, let us say, in a counter-clockwise direction as viewed from the operator's seat— that is, from the direction of the fly-ball governor 119. The planetary spider 65 and its sleeve 67 are locked in a fixed position by their being directly connected to the axles of the car, and hence to the emergency clutch. The secondary floating assembly consisting of the hollow shaft 14, the planetary spider 55 and the planetary pinions 58 then rotate in a counter-clockwise direction which, by choosing the appropriate ratios of the numbers of teeth, may be one-seventh of the engine speed. Meanwhile, the primary floating assembly consisting of the internal gear 40 and the pump casing 21 with its adjacent parts also rotates at twice the speed of the secondary floating assembly just described, but in a clockwise direction, say at two-sevenths of the engine speed. Consequently, this results in the speed of the primary floating assembly cancelling that of the secondary floating assembly, so that the result is a zero velocity for the driven assembly having the planetary spider 65. As a consequence, therefore, no driving power is delivered to the wheels of the car. It should be added, of course, that the clutch-releasing pins 95 and 107 are both actuated to the positions shown in Figure 8, whereby neither of the clutch locking disks 45 or 61 is locked to the transmission casing 52.

So long as the car is in "neutral" position, the control pedal 135 cannot be depressed unless the governor lock plate 112 is first released by depressing the "neutral" treadle 151 with the left foot. The engine can be "raced' for warming up and the car will begin to move forward only after the governor lock plate 112 has been released in this manner.

Forward motion in low gear

To set the car in motion in low gear, the emergency clutch of the car is released in the ordinary manner, thus freeing the axles of the car and hence freeing the output shaft 84 with the driven assembly connected thereto and terminating in the planetary spider 65 and the planetary pinions 69. The neutral treadle lever 148 is then depressed, this action releasing the governor lock plate 112; and at the same time the operator opens the throttle which increases the speed of the engine and thus accelerates the speed of the fly wheel 1. As the latter is drivingly connected to the hollow shaft 14 through the primary "sun" gear 10 and the planetary spider 55, the hollow shaft 14 likewise is accelerated, thereby rotating the fly-ball governor 119 at an increased speed.

Due to the rotation of the fly wheel 1 and the intermediate mechanism, the driving reaction on the primary floating assembly with its hollow internal gear 40 is in a clockwise direction. This tendency to rotate clockwise is prevented by the roller clutch locking disk 45, the rollers 90 of which have been released by the action of the releasing pins 95 moving forward out of engagement (Figure 11) so that the clutch is in full operation. It will be recalled that, under these conditions, the clutch disk 45 can be rotated only in a counter-clockwise direction, hence it is locked firmly to the transmission casing 52 by the clockwise driving reaction against the primary floating assembly.

The same action of the governor control rods 86, which frees the clutch releasing pins 95 of the locking clutch disk 45 also engages the clutch releasing pins 107, so that the locking clutch disk 61 will rotate freely in either direction.

The drive from the engine shaft 2 to the output shaft 84 leading to the axles of the car is now through gears only, and with but a small loss of power. The secondary floating assembly including the planetary spider 55 and the hollow shaft 14 now rotates at one-third of the engine speed in the same direction as the fly wheel 1—that is, counter-clockwise. Since the primary floating element including the hollow internal gear 40, the pump casing 21 and the sleeve 24 is locked in a stationary position in the manner just described (by the locking clutch disk 45), the planetary spider 55 drives the planetary spider 65 at two-thirds of its speed in the same direction through the engagement of the teeth 60 of the former with the pinions 69 of the latter. Thus the planetary spider 46 is now rotated at two-ninths of the speed of the engine drive shaft 2, and in the same direction.

The torque of the driven assembly, including the planetary spider 46, the sleeve 67 and the sliding gear 74, is now, therefore, four and one-half times as great as the torque of the fly wheel. Accordingly, neglecting losses of power in the transmission, the horsepower of the engine drive shaft 2 delivered to the output shaft 84 is expressed by the following formula:

$$\frac{2\pi tN}{33000} = \frac{2\pi Tn}{33000}$$

where $t$=driving (engine) torque, in lbs.
$T$=torque of the driven assembly, in lbs.
$N$=speed of the engine, in R. P. M.
$n$=speed of the driven assembly, in R. P. M.

Transition speeds from "low" to "high" speeds

Meanwhile the pump pinions 22 have been rotating and the pump consequently discharging fluid through its discharge ports 31, since these are wide open at the start. As the speed of the engine increases and the fly-ball governor swings outward, the cone 154 on the governor control shaft 15 (Figure 1) moves to the right. This forces the beveled rods 156 outward and the beveled rods 158 to the right, against the closure ring actuating pins 34, causing the closure ring 33 gradually to close the discharge ports 31.

This closure of the discharge ports 31 causes a reaction against the pump casing 21 so that the latter starts rotating in a counter-clockwise direction due to the pump driving gear torque. This reaction force is multiplied by the frictional engagement between the friction band 38 and its contact surface 18 on the fly wheel 1, resulting in a snubbing action. Thus increased torque is applied to the hollow internal gear 40 through its connection with the opposite end of the friction band 38, turning the gear 40 in a counter-clockwise direction.

The force developed by the wrapping action of the friction band 38 is expressed by the following formula:

$$F = Pe^{f\theta}$$

where $F$=force applied to the internal gear 40
$P$=force exerted by the pump case 21 on the free end of the friction band 38
$e$=base of natural logarithms=2.7182
$f$=coefficient of friction between material of friction band 38 and fly wheel portion 17.
$\theta$=angle of wrap of friction band, in radians.

As the pump discharge ports 31 become closed by the action of the closure ring 33 operated by the fly-ball governor 119 through the increasing speed of the engine, the speed of the pump case 21 approaches the speed of the fly wheel 1, and the planetary gears accordingly rotate as if locked together as a unit. The increasing action of the fly-ball governor 119 beyond this point, with the increasing speed of the engine eventually pulls the control rods 86 and the shift yokes 85 to the right to such an extent that the teeth 75 on the sliding gear 74 become intermeshed with the teeth 76 on the roller clutch lock disk 61. This establishes a direct drive connection between the engine shaft 2 and the output shaft 84, and the operation continues in "high" speed.

If it becomes necessary to reduce the speed of the car and increase the torque at the driving wheels, the control pedal 135 is depressed a small amount. This starts the rotation of the planetary gearing and of the gear pump within the casing 21, thus resulting in a higher torque, as needed in climbing a hill.

To halt the car or slow it down quickly, while the car is running in high speed with the sliding gear 74 locked to the roller clutch disk 61 through their teeth 75 and 76, the control pedal 135 is depressed. This unlocks the sliding gear 74 from the clutch disk 61 and also moves the pump closure ring 33 in such a manner as to open the discharge ports 31 of the pump. While this is being done, the right foot of the operator has been removed from the accelerator pedal and placed upon the foot brake, so that the axles are partially or wholly locked. This action correspondingly retards or halts the rotation of the driven assembly containing the planetary spider 65. As the speed of the car is reduced, the neutral pin 147 drops into the notch 146, interlocking the clutch control plate 112 in such a manner as to prevent the transmission unit from being placed in reverse: thus the car must be brought to a dead stop before it can be put into reverse. The "neutral" treadle 151 which operates the governor locking plate 112 is swung over the control pedal 135 and both are then depressed by the foot of the operator. Thus when the car is in "neutral", the control pedal 135 cannot be depressed until the governor locking plate 112 is first released by pressing the neutral pedal 151.

*Operating transmission in reverse*

To place the transmission unit in a "reverse" arrangement and cause the car to move backward, the governor locking plate 112 is shifted, thereby moving the control rods 86 into the position shown in Figure 10. In this position the clutch-releasing rods 95 are maintained in operation, whereas the clutch-releasing rods 107 are freed. As a consequence the roller clutch locking disk 45 is released so that the primary floating assembly including the internal gear 40 is permitted to rotate in a clockwise direction. This results in rotating the driven assembly including the planetary spider 65, in a clockwise direction at one-sixth of the engine speed, hence causes the car to move backward. While this occurs, the roller clutch locking disk 61 is locked against counter-clockwise motion of the secondary floating assembly including the planetary spider 55 and the hollow governor shaft 14.

Thus the roller clutches can prevent rotation in one direction only when they are in an operative condition, as when the releasing pins 95 and/or 107 are allowed to move backward out of engagement with the clutch rollers 90 and/or 101. When these roller clutches are unlocked, as when the pins 95 and/or 107 are forced forward against the clutch rollers 90 and/or 101, rotation in either direction is possible.

Summing up the various positions of the locking clutches, the operation will be as follows:

(1) For "neutral" operation, both of the clutch locking disks 45 and 61 will be "off" (released), as in Figure 8;

(2) For "low" speed, locking disk 45 will be "on" (locked), and locking disk 61 will be "off", as in Figure 11;

(3) For "high" speed, locking disk 45 will be "on" and locking disk 61 will be "off", as in Figure 12;

(4) For "reverse", locking disk 45 will be "off" and locking disk 61 will be "on", as in Figure 10.

It will be understood that the above-mentioned speed ratios are purely illustrative, and may be changed without departing from the main idea of the invention. It will also be understood that one or both of the spur type planetary gear trains may be replaced with bevel gears. It will be further understood that the transmission unit of my invention can be operated with a clutch interposed between the engine and transmission unit, if this should be found desirable.

It will be further understood that I desire to comprehend within my invention such modifications as may be necessary to adapt it to varying conditions and uses.

Having thus fully described my invention, what I claim as new and desire to secure by Letters Patent is:

1. In a power transmission unit, a driving member, a driven member, variable speed planetary gearing connected to one of said members, a fluid-operated machine connected to said planetary gearing, mechanism responsive to the speed of said driving member operatively connected thereto and adapted to change the setting of said variable speed planetary gearing, whereby to vary the speed ratio between said driving and said driven members, means for manually altering the automatic setting of said variable speed planetary gearing, and clutch means arranged selectively to interconnect said fluid-operated machine and the other of said members.

2. In a power transmission unit, a power input member, a planetary gear set connected thereto, a power output member, a second planetary gear set connected thereto, means interconnecting said planetary gear sets whereby to vary the speed ratio between said input and output members, and automatically adjustable speed-increasing means comprising a fluid pressure pump operatively connected between said input member and said interconnecting means, whereby said speed-increasing means is adapted to apply a variable speed-increasing force to said interconnecting means.

3. In a power transmission unit, a power input member, a planetary gear set connected thereto, a power output member, a second planetary gear set connected thereto, means interconnecting said planetary gear sets whereby to vary the speed ratio between said input and output members, and automatically adjustable speed-increasing means comprising a fluid pressure pump operatively connected between said input member and said interconnecting means, whereby said speed-increasing means is adapted to apply a variable speed-increasing force to said interconnecting means, the adjustment whereof is responsive to the speed of one of said members.

4. In a power transmission unit, a power input member, a planetary gear set connected thereto, a power output member, a second planetary gear set connected thereto, means interconnecting said planetary gear sets whereby to vary the speed ratio between said input and output members, and automatically adjustable speed-increasing means comprising a fluid pressure pump operatively connected between said input member and said interconnecting means, whereby said speed-increasing means is adapted to apply a variable speed-increasing force to said interconnecting means, said speed-increasing means including a clutching member operatively connected to said interconnecting means.

5. In a power transmission unit, a power input member, a planetary gear set connected thereto, a power output member, a second planetary gear set connected thereto, means interconnecting said planetary gear sets whereby to vary the speed ratio between said input and output members, automatically adjustable speed-increasing means comprising a fluid pressure pump operatively connected between said input member and said interconnecting means, whereby said speed-increasing means is adapted to apply a variable increasing torque to said interconnecting means, and centrifugally operated means dependent on the speed of the input member for controlling the adjustment of said pump.

6. In a power transmission unit, a power input member, a planetary gear set connected thereto, a power output member, a second planetary gear set connected thereto, means interconnecting said planetary gear sets whereby to vary the speed ratio between said input and output members, automatically adjustable speed-increasing means comprising a fluid pressure pump operatively connected between said input member and said interconnecting means, whereby said speed-increasing means is adapted to apply a variable speed-increasing force to said interconnecting means, centrifugally-operated means for controlling the adjustment of said pump, and manual means for varying the setting of said centrifugally-operated means.

7. In a power transmission unit, a power input member, a planetary gear set connected thereto, a power output member, a second planetary gear set connected thereto, a fluid-operated means adapted to actuate friction-applying means to interconnect said planetary gear sets whereby to vary the speed ratio between said input and output members, and means for reversing the direction of motion of said output member relative to said input member.

8. In a power transmission unit, a power input member, a planetary gear set connected thereto, a power output member, a second planetary gear set connected thereto, a fluid operated means adapted to actuate friction-applying means to interconnect said planetary gear sets whereby to vary the speed ratio between said input and output members, and means for establishing a direct driving connection between said input and output members when the speed of one of said members reaches a predetermined value.

9. In a power transmission unit, a power input member, a planetary gear set connected thereto, locking clutch means operatively connected to said gear set, a power output member, a second planetary gear set connected thereto, speed-increasing means operatively connected to said second planetary gear set, means interconnecting said planetary gear sets whereby to vary the speed ratio between said input and output members, and locking clutch means operatively connected to said interconnecting means.

10. In combination, a driving means, a driven means, a planetary gear means connected to the driven means and having a part interposed between the driven means and the driving means, a governor connected to said driving means interposed by the means associated with the governor for controlling the output of said pump for causing the pump to turn with the driving means, a supplementary clutch to assist the connection between the pump and the driving means, and a locking clutch between the driven means and the intermediate portion of the planetary gearing.

11. In a power transmission mechanism, a driving shaft, a driven shaft, an intermediately-disposed hydraulic pump freely supported upon the driving member and driven thereby, a clutch interposed between said pump and said driving member, a means to regulate the pumping action according to the speed of rotation of the driving means, and a planetary transmission system comprising a portion of the pump mechanism, a portion of the driving mechanism, and a portion of the driven mechanism whereby until the pump and the driven member travel together as a unit the intermediate speeds and variations thereof are accommodated by the planetary transmission.

12. In a power transmission mechanism, a driving shaft, a driven shaft, an intermediately-disposed hydraulic pump freely supported upon the driving member and driven thereby, a clutch interposed between said pump and said driving member, means to regulate the pumping action according to the speed of rotation of the driving means, a planetary transmission system comprising a portion of the pump mechanism, a portion of the driving mechanism, a portion of the driven mechanism whereby until the pump and the driven member travel together as a unit the intermediate speeds and variations thereof are accommodated by the planetary transmission, and means for selectively determining the direction of rotation of the driven element.

FREDERICK W. SEYBOLD.